US010959266B2

(12) United States Patent
Li et al.

(10) Patent No.: US 10,959,266 B2
(45) Date of Patent: Mar. 23, 2021

(54) OFDMA CONTENTION METHOD AND ACCESS POINT

(71) Applicant: Huawei Technologies Co., Ltd., Shenzhen (CN)

(72) Inventors: Yunbo Li, Shenzhen (CN); Tianyu Wu, Shenzhen (CN); Lianbo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/891,919

(22) Filed: Feb. 8, 2018

(65) Prior Publication Data

US 2018/0167977 A1    Jun. 14, 2018

Related U.S. Application Data

(63) Continuation of application No. 14/843,770, filed on Sep. 2, 2015, now abandoned, which is a continuation
(Continued)

(30) Foreign Application Priority Data

Mar. 22, 2013    (CN) .......................... 201310094952.X (51) Int. Cl.
*H04W 74/08*    (2009.01)
*H04W 24/02*    (2009.01)
(Continued)

(52) U.S. Cl.
CPC ....... *H04W 74/0825* (2013.01); *H04W 24/02* (2013.01); *H04W 72/005* (2013.01); *H04W 72/1205* (2013.01); *H04W 84/12* (2013.01)

(58) Field of Classification Search
None
See application file for complete search history.

(56) References Cited

U.S. PATENT DOCUMENTS

2008/0259857 A1    10/2008 Zheng
2009/0196273 A1    8/2009 Kwon et al.
(Continued)

FOREIGN PATENT DOCUMENTS

CN    1941666 A    4/2007
CN    101098296 A    1/2008
(Continued)

OTHER PUBLICATIONS

Shimamoto et al. (Two-Stage DCF-based Access Scheme for Throughput Enhancement of OFDMA WLAN Systems, Sep. 24-27, 2012) (Year: 2012).*
(Continued)

*Primary Examiner* — Peter Chen
*Assistant Examiner* — Jeff Banthrongsack
(74) *Attorney, Agent, or Firm* — Leydig, Voit & Mayer, Ltd.

(57) ABSTRACT

Embodiments of the invention provide a contention method. The contention method includes: receiving, by an access point, an uplink frame transmitted by a station; transmitting, by the access point, a frame responding to the uplink frame. The frame responding to the uplink frame is used to acknowledge the uplink frame and trigger the station to enter the next channel contention period. The contention method can acknowledge the uplink frame and trigger the station to enter the next channel contention period.

20 Claims, 8 Drawing Sheets

Related U.S. Application Data of application No. PCT/CN2013/087597, filed on Nov. 21, 2013.

(51) Int. Cl.
*H04W 72/00* (2009.01)
*H04W 72/12* (2009.01)
*H04W 84/12* (2009.01)

(56) References Cited

U.S. PATENT DOCUMENTS

| | | | |
|---|---|---|---|
| 2009/0310692 A1 | 12/2009 | Kafle et al. | |
| 2010/0208681 A1 | 8/2010 | Elmaleh | |
| 2011/0039568 A1 | 2/2011 | Zhang et al. | |
| 2011/0134862 A1 | 6/2011 | Huang et al. | |
| 2011/0317633 A1 | 12/2011 | Tan et al. | |
| 2012/0014269 A1* | 1/2012 | Ray | H04W 74/006 370/252 |
| 2012/0320856 A1* | 12/2012 | Kim | H04W 28/26 370/329 |
| 2013/0195081 A1* | 8/2013 | Merlin | H04W 74/002 370/336 |

FOREIGN PATENT DOCUMENTS

| | | |
|---|---|---|
| CN | 101331787 A | 12/2008 |
| CN | 101491139 A | 7/2009 |
| CN | 102113401 A | 6/2011 |
| CN | 102387592 A | 3/2012 |
| CN | 102714872 A | 10/2012 |

OTHER PUBLICATIONS

Shimamoto et al., "Two-Stage DCF-based Access Scheme for Throughput Enhancement of OFDMA WLAN Systems," 2012 15th International Symposium on Wireless Personal Multimedia Communications (WPMC), Taipei, Taiwan, XP032294304, pp. 584-588, Institute of Electrical and Electronics Engineers, New York, New York (Sep. 24-27, 2012).

Haile et al., "C-OFDMA: Improved Throughput for Next Generation WLAN Systems Based on OFDMA and CSMA/CA," 2013 4th International Conference on Intelligent Systems, Modelling and Simulation (ISMS), Bangkok, Thailand, XP032364326, pp. 497-502, Institute of Electrical and Electronics Engineers, New York, New York (Jan. 29-31, 2013).

Zhang, "Multi-Round Contention in Wireless LANs with Multipacket Reception," IEEE Transactions on Wireless Communications, vol. 9, No. 4, pp. 1503-1513, Institute of Electrical and Electronics Engineers, New York, New York (Apr. 2010).

* cited by examiner

OFDMA CONTENTION METHOD AND ACCESS POINT

CROSS-REFERENCE TO RELATED APPLICATIONS

This application is a continuation of U.S. patent application Ser. No. 14/843,770, filed on Sep. 2, 2015, which is a continuation of International Application No. PCT/CN2013/087597, filed on Nov. 21, 2013. The International Application claims priority to Chinese Patent Application No. 201310094952.X, filed on Mar. 22, 2013. All of the aforementioned patent applications are hereby incorporated by reference in their entireties.

TECHNICAL FIELD

Embodiments of the present invention relate to computer and communication technologies and, in particular, to an OFDMA contention method and an access point.

BACKGROUND

In WLAN (wireless local access network), a CSMA/CA (carrier sense multiple access with collision avoidance) contention mechanism is used. The time to initiate a contention in the contention mechanism is determined by a STA (station) according to the channel state monitored by the STA itself. Since it is an fully distributed contention mechanism, a central controller is not needed, and it is very suitable for performing contention between stations in an unauthorized frequency band, such as, ISM (Industrial Scientific Medical), TVWS and the like. And in the CSMA/CA, a size of a contention window increases with the number of collisions, thereby adapting to various scenarios with different number of stations.

However, with an increase of the number of STAs in BSS (basic service set), the system efficiency is reduced because of collisions and back-off. An OFDMA (orthogonal frequency division multiplexing access) contention is a potential solution. The OFDMA contention divides a whole channel into several subchannels, and a plurality of stations can initiate contentions on different subchannels at the same time. Therefore, the time of contentions between multiple stations can be shortened, and the probability of collisions happening can be reduced. Although there is a plurality of contention channels in the OFDMA contention, for system efficiency, the number of contention channels is generally less than that of stations. This is because the communication bandwidth is fixed, the more subchannels, the narrower the bandwidth of a single subchannel is, which leads to the fact that the time of transmitting a contention request frame gets longer in each contention. Besides, when the number of contention channels is more than that of stations, idle subchannels are wasted. Therefore, generally, the whole channel is divided into a plurality of subchannels, and all stations share all the subchannels through contention.

The number of stations succeeding in each contention is a very important factor to an OFDMA system. In one aspect, the more stations succeeding in each contention, it means the shorter the contention process is, and the less the system cost of contention is. In another aspect, the more the stations succeeding in each contention, the more frequency selective gain can be obtained.

In the single-channel CSMA/CA contention mechanism, a selection of the size of the contention window is to reduce the probability of collisions happening. However, it is different in the OFDMA contention, for the single subchannel, the probability of collisions should be reduced, however under this precondition, for different subchannels, the more the stations which initiate contentions at the same contention time, the better. Hence, The requirement of design for the contention window of the OFDMA contention is different from that of the CSMA/CA contention. Especially in the system which requires a coexistence of both stations using the two kinds of contention mechanisms, in order to ensure that the contention priority of the CSMA/CA stations is not lowered, a larger contention window may be used, which will affect the efficiency of the OFDMA contention seriously.

Figure 1:
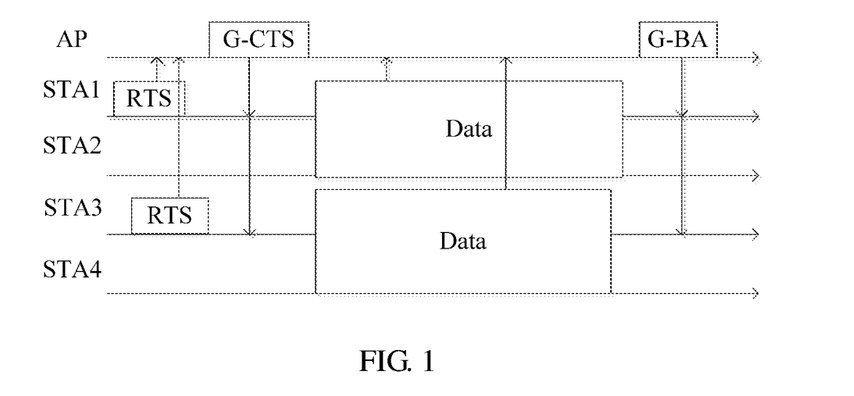
FIG. 1 is a time sequence diagram of an OFDMA contention method in the prior art.

FIG. 1 is a schematic time sequence diagram of an OFDMA contention method in the prior art, and the entire process of contention and transmitting data includes the following steps:

the first step: a plurality of stations transmit contention frames, RTS (request to send), on a plurality of subchannels;

the second step: an AP (access point) transmits G-CTS (group CTS, the CTS is a response to the RTS frame) to all stations succeeding in the contention, and the AP allocates a resource to the stations succeeding in the contention in the G-CTS frame;

the third step: the stations succeeding in the contention transmit data on the allocated frequency and time resources; and the fourth step: the AP replies to the stations with acknowledgement frames, G-BA (group BA, BA is block acknowledgement).

The above mentioned contention method has only one round of contention, in a situation that the number of stations succeeding in the contention is quite few due to factors such as the inappropriate contention window settings, or collisions and the like, there is no effective mechanism to further increase the number of the stations succeeding in the contention, which causes reduced system throughput.

SUMMARY

Embodiments of the present invention provide an OFDMA contention method and an access point, which are used to solve the problem that the system throughput is reduced because the number of stations succeeding in a contention is few in prior art.

In order to solve the above mentioned problem, embodiments of present invention provides the following technical solutions:

In one aspect, an OFDMA contention method is provides, which includes:

receiving, by an access point, a contention request frame transmitted by a station over a subchannel; and judging whether a sum of a number of stations succeeding in a contention in a current channel contention period and a number of stations succeeding in a historic contention is minor than a preset threshold, if yes, triggering the station to enter a next channel contention period, and repeatedly executing the steps of the receiving, by the access point, the contention request frame transmitted by the station over the subchannel, and the judging whether the sum of the number of stations succeeding in the contention in the current channel contention period and the number of stations succeeding in the historic contention is minor than the preset threshold, until a number of stations succeeding in contentions is greater than or equal to the preset threshold.

In a first possible implementation of the first aspect, the triggering the station to enter the next channel contention period includes:

transmitting, by the access point, a first request response frame in a broadcast mode, to acknowledge a success of contention to a station succeeding in the contention in the current channel contention period, and triggering the station to enter the next channel contention period; and the repeatedly executing the steps of the receiving, by the access point, the contention request frame transmitted by the station over the subchannel, and the judging whether the sum of the number of stations succeeding in the contention in the current channel contention period and the number of stations succeeding in the historic contention is minor than the preset threshold, until the number of stations succeeding in contentions is greater than or equal to the preset threshold, includes:

repeatedly executing the steps of the receiving, by the access point, the contention request frame transmitted by the station over the subchannel, and the judging whether the sum of the number of stations succeeding in the contention in the current channel contention period and the number of stations succeeding in the historic contention is minor than the preset threshold, until the number of stations succeeding in contentions is greater than or equal to the preset threshold; otherwise, transmitting, by the access point, a second request response frame in the broadcast mode, to acknowledge a success of contention to a station succeeding in a contention in the last channel contention period, and terminating procedure.

In a second possible implementation of the first aspect, the OFDMA contention method, is characterized in further including:

judging whether a number of channel contention periods reaches a preset period threshold, if yes, performing the step of transmitting, by the access point, the second request response frame in the broadcast mode, to acknowledge a success of contention to the station succeeding in the contention in the current channel contention period; otherwise, performing the judging whether the sum of the number of stations succeeding in contention in the current channel contention period and the number of stations succeeding in the historic contention is minor than the preset threshold.

In a third possible implementation of the first aspect, the method further includes:

monitoring whether channel contention time reaches a preset time threshold, if yes, transmitting, by the access point, a contention termination frame in the broadcast mode, to notify the station that a channel contention is terminated.

In a fourth possible implementation of the first aspect, where:

when transmitting, by the access point, the first request response frame in the broadcast mode, the first request response frame is further used to allocate a resource to the station succeeding in the contention in the current channel contention period; and when transmitting, by the access point, the second request response frame in the broadcast mode, the second request response frame is further used to allocate a resource to the station succeeding in the contention in the last channel contention period.

In a fifth possible implementation of the first aspect, where when transmitting, by the access point, the second request response frame in the broadcast mode, the second request response frame is further used to allocate a resource to both the station succeeding in the contention in the last channel contention period and the station succeeding in the historic contention.

In a sixth possible implementation of the first aspect, where after the transmitting, by the access point, the second request response frame in the broadcast mode, to acknowledge the success of contention to the station succeeding in the contention in the last channel contention period, further including:

performing, by the access point, an acknowledgment response after the stations succeeding in contentions finish data transmitting.

In a seventh possible implementation of the first aspect, where the triggering the station to enter the next channel contention period, includes:

waiting, by the access point, for a first preset time without response, to trigger the station to enter the next channel contention period; and the repeatedly executing the steps of the receiving, by the access point, the contention request frame transmitted by the station over the subchannel, and the judging whether the sum of the number of stations succeeding in the contention in the current channel contention period and the number of stations succeeding in the historic contention is minor than the preset threshold, until the number of stations succeeding in contentions is greater than or equal to the preset threshold, includes:

repeatedly executing the steps of the receiving, by the access point, the contention request frame transmitted by the station over the subchannel, and the judging whether the sum of the number of stations succeeding in the contention in the current channel contention period and the number of stations succeeding in the historic contention is minor than the preset threshold, until the number of stations succeeding in contentions is greater than or equal to the preset threshold; otherwise, transmitting, by the access point, a third request response frame in the broadcast mode after waiting for a second preset time, to acknowledge a success of contention to all stations succeeding in contentions;

where length of the first preset time is longer than that of the second preset time.

In an eighth possible implementation of the first aspect, where before the judging whether the sum of the number of stations succeeding in the contention in the current channel contention period and the number of stations succeeding in the historic contention is minor than the preset threshold, it further includes:

judging whether a number of channel contention periods reaches a preset period threshold, if yes, performing directly the step of transmitting, by the access point, the third request response frame in the broadcast mode after waiting for the second preset time, to acknowledge the success of contention to all stations succeeding in contentions; otherwise, performing the judging whether the sum of the number of stations succeeding in contention in the current channel contention period and the number of stations succeeding in the historic contention is minor than the preset threshold.

In a ninth possible implementation of the first aspect, the method further includes:

monitoring whether channel contention time reaches a preset time threshold, if yes, performing directly the step of transmitting, by the access point, the third request response frame in the broadcast mode after waiting for the second preset time, to acknowledge the success of contention to all stations succeeding in contentions.

In a tenth possible implementation of the first aspect, where:

when transmitting, by the access point, the third request response frame in the broadcast mode after waiting for the second preset time, the third request response frame is further used to allocate a resource to all stations succeeding in contentions.

In an eleventh possible implementation of the first aspect, where after the transmitting, by the access point, the third request response frame in the broadcast mode after waiting for the second preset time, to acknowledge the success of contention to all stations succeeding in contentions, it further includes:

performing, by the access point, an acknowledgment response, after the stations succeeding in contentions finish data transmitting.

In a second aspect, an AP is provided, which includes:

a request receiving unit, configured to receive a contention request frame transmitted by a station over a subchannel; and a request processing unit, configured to judge whether a sum of a number of stations succeeding in a contention in a current channel contention period and a number of stations succeeding in a historic contention is minor than a preset threshold, if yes, trigger the station to enter a next channel contention period, until a number of stations succeeding in contentions is greater than or equal to the preset threshold.

In a first possible implementation of the second aspect, where the request processing unit includes:

a first threshold judging module, configured to judge whether the sum of the number of stations succeeding in the contention in the current channel contention period and the number of stations succeeding in the historic contention is minor than the preset threshold, if yes, transmit a first notification message to a first response module; otherwise, transmit a second notification message to a second response module;

the first response module, configured to transmit a first request response frame in a broadcast mode according to the first notification message, to acknowledge a success of contention to a station succeeding in the contention in the current channel contention period, and trigger the station to enter the next channel contention period; and the second response module, configured to transmit a second request response frame in the broadcast mode according to the second notification message, to acknowledge a success of contention to a station succeeding in a contention in the last channel contention period.

In a second possible implementation of the second aspect, where the request processing unit further includes:

a first number judging module, configured to judge whether the number of channel contention periods reaches a preset period threshold, if yes, transmit the second notification message to the second response module; otherwise, transmit a first threshold judging message to the first threshold judging module.

In a third possible implementation of the second aspect, where the request processing unit further includes:

a first time monitoring module, configured to monitor whether channel contention time reaches a preset time threshold, if yes, transmit a contention termination frame in the broadcast mode, to notify the station that a channel contention is terminated.

In a fourth possible implementation of the second aspect, where: the first response module is further configured to allocate a resource to the station succeeding in the contention in the current channel contention period through the first request response frame; and the second response module is further configured to allocate a resource to the station succeeding in the contention in the last channel contention period through the second request response frame.

In a fifth possible implementation of the second aspect, where the second response module is further configured to allocate a resource to both the station succeeding in the contention in the last channel contention period and the station succeeding in the historic contention through the second request response frame.

In a sixth possible implementation of the second aspect, the AP further includes: an acknowledgement response module, configured to perform an acknowledgment response, after the stations succeeding in contentions finish data transmitting.

In a seventh possible implementation of the second aspect, where the request processing unit includes:

a second threshold judging module, configured to judge whether the sum of the number of stations succeeding in the contention in the current channel contention period and the number of stations succeeding in the historic contention is minor than the preset threshold, if yes, the access point waits for a first preset time without response, to trigger the station to enter the next channel contention period; otherwise, transmit a third notification message to a third response module; and the third response module, configured to transmit a third request response frame in the broadcast mode after waiting for a second preset time according to the third notification message, to acknowledge a success of contention to all stations succeeding in contentions;

where length of the first preset time is longer than that of the second preset time.

In an eighth possible implementation of the second aspect, where the request processing unit further includes:

a second number judging module, configured to judge whether the number of channel contention periods reaches a preset period threshold, if yes, transmit the third notification message to the third response module; otherwise, transmit a second threshold judging message to the second threshold judging module.

In a ninth possible implementation of the second aspect, where the request processing unit, further includes:

a second time monitoring module, configured to monitor whether channel contention time reaches a preset time threshold, if yes, transmit the third notification message to the third response module.

In a tenth possible implementation of the second aspect, where the third response module is further configured to allocate a resource to all stations succeeding in contentions through the third request response frame.

The OFDMA contention method and the access point provided by the present invention, may go on with initiating a contention when the number of stations succeeding in a initial contention is minor than a certain threshold, so as to increase the number of stations succeeding in contentions, and thus improve the throughput of the OFDMA system; meanwhile, the OFDMA contention method is compatible with the existing mechanism, when the number of stations succeeding in the initial contention reaches the threshold, there is no extra cost, which is easily combined with the current OFDMA system, and is convenient to be widely applied.

BRIEF DESCRIPTION OF DRAWINGS

To describe the technical solutions in embodiments of the present invention or in the prior art more clearly, the following briefly introduces the accompanying drawings needed for describing the embodiments or the prior art. Apparently, the accompanying drawings in the following description illustrate merely some embodiments of the present invention, and persons of ordinary skill in the art may still derive other drawings from these accompanying drawings without creative efforts.

DESCRIPTION OF EMBODIMENTS

To make the objectives, technical solutions, and advantages of embodiments of the present invention clearer, the following clearly and comprehensively describes the technical solutions in embodiments of the present invention with reference to the accompanying drawings in embodiments of the present invention. Apparently, the described embodiments are merely a part of rather than all embodiments of the present invention. All other embodiments obtained by persons of ordinary skill in the art based on embodiments of the present invention without creative efforts shall fall within the protection scope of the present invention.

The present invention applies to an OFDMA multiple-subchannels contention system. When the number of stations succeeding in a first contention does not reach a certain threshold, multiple rounds of contention can be initiated continuously, so as to increase the number of STAs succeeding in contentions, and thus increase system throughput.

The following describes specific implementations of the present invention in further details, with reference to the accompanying drawings and embodiments of the present invention. The following embodiments are used to describe the present invention, but not to limit the scope of the present invention.

Figure 2:
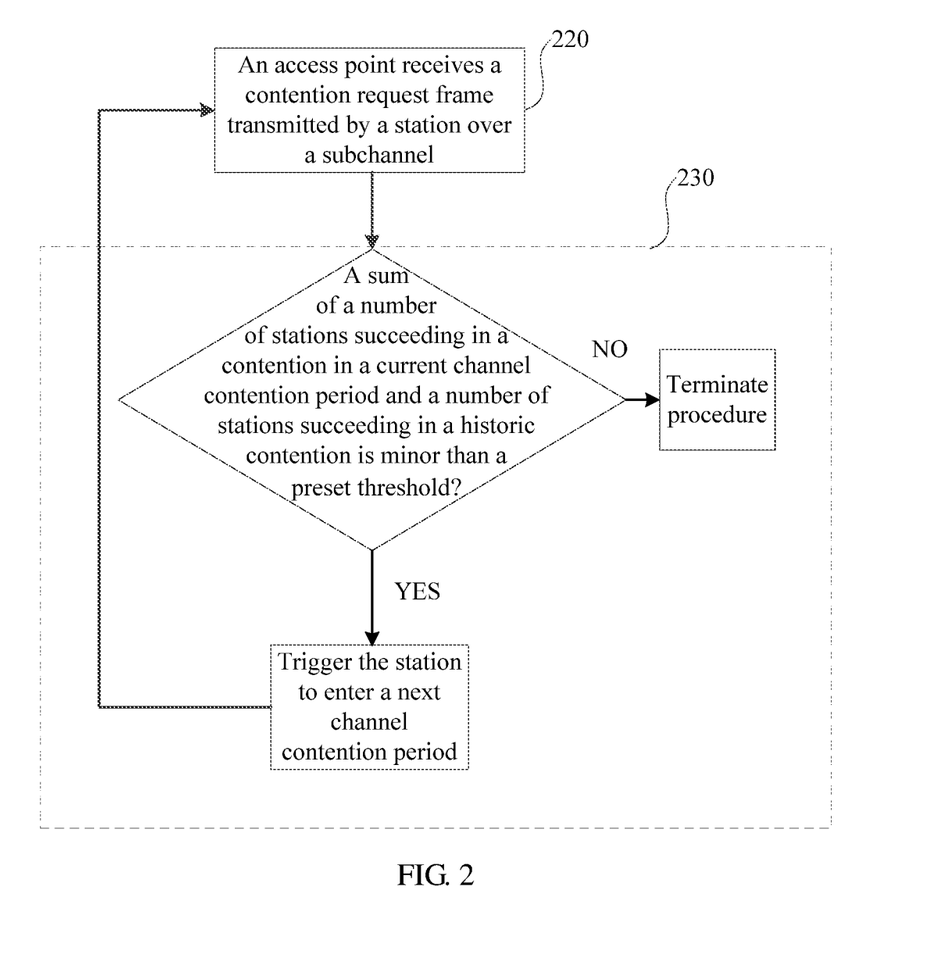
FIG. 2 is a flowchart of an OFDMA contention method according to the present invention.

FIG. 2 is a flowchart of an OFDMA contention method according to an embodiment of the present invention, as shown in FIG. 2, the method includes:

step 220: an access point receives a contention request frame transmitted by a station on a subchannel.

step 230: judge whether a sum of a number of station succeeding in a contention in a current channel contention period and a number of station succeeding in a historic contention is minor than a preset threshold, if yes, trigger the station to enter a next channel contention period, and execute step 220 and step 230 repeatedly until a number of stations succeeding in contentions is greater than or equal to the preset threshold.

In the present embodiment, the contention request frame is the RTS frame.

In addition, before the step 220, it may further includes:

step 210: the station is triggered to perform a channel contention.

A triggering mechanism is required before a station having data to be transmitted and transmits a contention request frame. The triggering mechanism itself is not an important point of the protection scope of the present patent, it may be that a channel is idle for a certain length of time, for example, the length of time for which the channel is idle is DIFS (distributed (coordination function) interframe space), or, it may be receiving a contention triggering frame transmitted by the AP, for example, R-Poll.

In a preferred embodiment of the present invention, the step 230 specifically includes:

step 231: The AP judges whether the sum of the number of stations succeeding in the contention in the current channel contention period and the number of the stations succeeding in the historic contention is minor than the preset threshold, if yes, the AP transmit a first request response frame in a broadcast mode, to acknowledge a success of contention to a station succeeding in the contention in the current channel contention period, and triggers the station to enter the next channel contention period, and execute step 220 and 231 repeatedly, until the number of stations succeeding in contentions is greater than or equal to the preset threshold; otherwise, the AP transmits a second request response frame in the broadcast mode, to acknowledge a success of contention to a station succeeding in the contention in the last channel contention period, and terminates procedure.

Figure 3:
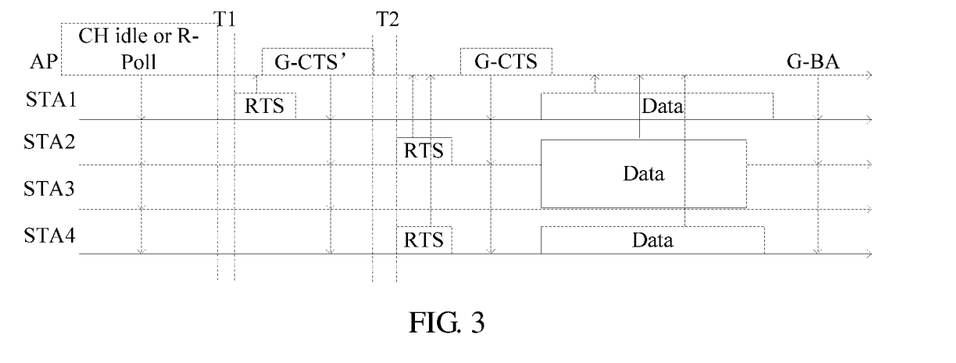
FIG. 3 is a time sequence diagram of an OFDMA contention method according to an embodiment of the present invention.

Referring FIG. 3, after the channel is idle (i.e., CH idle) or receiving the contention triggering frame (i.e., R-Poll frame), the station STA1 firstly performs back-off, where back-off time is T1, and may select a subchannel to transmit a contention request frame RTS to the access point AP if the channel is still idle after the back-off is finished. The AP shall perform receipt on all subchannels, and determine the number of stations succeeding in contentions. If the number of stations succeeding in contentions is minor than a preset threshold, the AP will transmit a first request response frame G-CTS' in the broadcast mode, where the G-CTS' on one hand acknowledges a success of contention to the stations succeeding in the contention, and on the other hand triggers the station to enter the next channel contention period. Presume that the preset threshold is 3, and the station succeeding in the contention in the first channel contention period only includes STA1, then the next channel contention period is going to be performed.

A station which is not succeed in a contention in a last channel contention period, may repeat the process of transmitting a contention request, that is firstly perform back-off, and if the channel is still idle after the back-off is finished, then select a subchannel to transmit an RTS frame. After receiving the RTS frame in a new channel contention period, the AP shall judge whether the total number of the stations succeeding in contentions reaches the threshold, if it is still minor than the threshold, then the AP may reply a G-CTS' frame again. This time, the G-CTS' frame acknowledges a success of contention to the station which is just succeeding in the contention, and triggers the station to enter a next channel contention period.

Referring to FIG. 3, the stations STA2 and STA 4 firstly perform back-off, where back-off time is T2, and may select a subchannel to transmit contention request frames RTS to the access point AP if the channel is still idle after the back-off is finished. The AP shall perform receipt on all subchannels, and judge whether the sum of the number of stations succeeding in the contention in the current channel contention period and the number of stations succeeding in the historic contention is minor than the preset threshold, if the judging result shows that the sum of the number of stations succeeding in the contention in the current channel contention period and the number of stations succeeding in the historic contention is 3, which is larger than or equal to the preset threshold 3, then the AP transmits a second request response frame G-CTS in the broadcast mode, to acknowledge a success of contention to the station succeeding in the contention in the last channel contention period.

If the sum of the number of the stations succeeding in the contention in the current channel contention period and the number of the stations succeeding in the historic contention is minor than the preset threshold, the AP may repeat the step 220 and step 231 continuously, until the number of the stations succeeding in contentions reaches the preset threshold. However, take factors such as delay into consideration, an upper limit of the number of contention periods may be set, and when the number of continuous periods in which contentions are initiated reaches the upper limit, even though the number of the stations succeeding in contentions does not reach the preset threshold, a next channel contention period would not be initiated.

In a preferred embodiment of the present invention, it further includes steps of:

judging whether the number of channel contention periods reaches a preset period threshold, if yes, directly executing the step of transmitting, by the access point, the second request response frame in the broadcast mode, to acknowledge a success of contention to a station succeeding in the contention in the current channel contention period; otherwise, judging whether the sum of the number of stations succeeding in the contention in the current channel contention period and the number of stations succeeding in the historic contentions is minor than the preset threshold.

In addition, a situation of unlimited contentions can be avoided through monitoring channel contention time, preferably, the method further includes:

monitoring whether channel contention time reaches a preset time threshold, if yes, the access point transmits a contention termination frame in the broadcast mode, to notify the station that the channel contention is terminated.

Wherein, the start time of monitoring the channel contention time may be that the station is triggered to perform the channel contention, or may also be that the access point begins to receive the contention request frame. The contention termination frame is transmitted to all the stations in the broadcast mode, and if the station succeeding in the contention in the last channel contention period does not receive the second request response frame yet, then the station firstly completes the acknowledgement of a success of contention after receiving the contention termination frame, and then may transmit data; if the station succeeding in the contention in the last channel contention period has already received the second request response frame, then the station may directly transmit data after receiving the contention termination frame.

In this implementation, there are two ways to allocate resources (time and/or frequency) to the stations succeeding in a contention:

when the access point transmits the first request response frame in the broadcast mode, the first request response frame is further used to allocate a resource to the station succeeding in the contention in the current channel contention period; and when the access point transmits the second request response frame in the broadcast mode, the second request response frame is further used to allocate a resource to the station succeeding in the contention in the last channel contention period. Or, when the access point transmits the second request response frame in the broadcast mode, the second request response frame is further used to allocate a resource to both the stations succeeding in the contention in the last channel contention period and the stations succeeding in the historic contention.

In addition, after receiving the G-CTS frame, all the stations succeeding in contentions transmit data according to the allocated frequency and/or time resources.

After all the stations succeeding in contentions finish data transmitting, the AP transmits G-BA to perform an acknowledgement response to all the stations succeeding in contentions.

In another preferred embodiment of the present invention, the above step 230 specifically includes:

step 231': the access point judges whether the sum of the number of stations succeeding in the contention in the current channel contention period and the number of stations succeeding in the historic contention is minor than a preset threshold, if yes, the access point waits for a first preset time without response, to trigger the station to enter the next channel contention period, and executes the steps 220 and 231' repeatedly, until the number of stations succeeding in contentions is greater than or equal to the preset threshold; otherwise, after waiting for a second preset time, the access point transmit a third request response frame in the broadcast mode, to acknowledge a success of contention to all stations succeeding in contentions, and terminates the procedure.

Where the length of the first preset time is longer than that of the second preset time.

Figure 4:
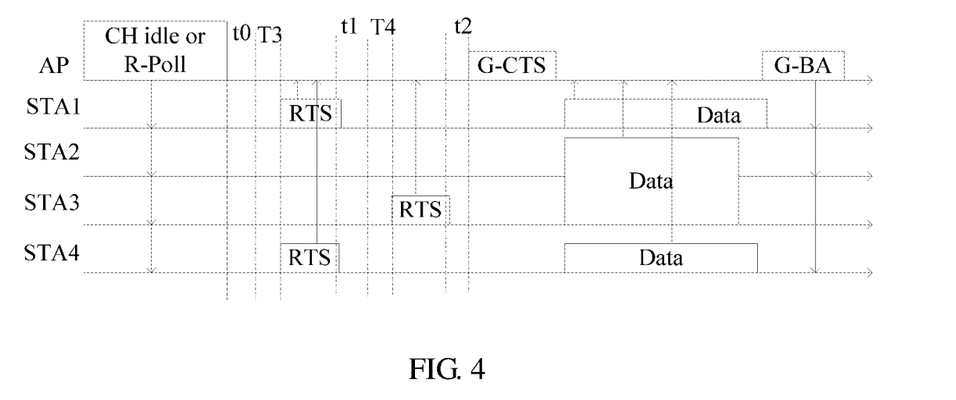
FIG. 4 is a time sequence diagram of an OFDMA contention method according to another embodiment of the present invention.

Referring to FIG. 4, the contention triggering mechanism in this implementation may also be that a channel is idle for a certain length of time or a contention triggering frame transmitted by an AP is received. When the triggering mechanism is the case that the channel is idle for a certain length of time, t0 as shown in the figure is not needed; when the triggering mechanism is the case that an R-Poll frame is received, t0 is a time interval from receiving the R-Poll frame to beginning to perform back-off, which may be SIFS.

In FIG. 4, in the first channel contention period, multiple STAs which meet the conditions of contention and then enter the contention phase, firstly need to perform back-off, assuming that the back-off time of STA1 and STA4 is T3 which is the shortest back-off time of that of all the contention stations, if the channel is still idle after the back-off is finished, then the subchannel is respectively selected to transmit a request frame RTS.

The AP performs receipt on all the subchannels, and judges the number of stations succeeding in contentions. The number of the stations succeeding in the contention in the first channel contention period is 2, which is minor than the preset threshold 3, the AP does not response temporarily. If the stations do not receives a third request response frame (where the third request response frame may use a G-CTS) transmitted by the AP when a first preset time after transmitting the RTS frame in the first channel contention period is passed, the stations may repeat the process of transmitting a contention request, that is, firstly perform back-off, and if the channel is still idle after the back-off is finished, then select a subchannel to transmit an RTS frame. After receiving the RTS frame in a new channel contention period, the AP shall judge whether the sum of the number of the stations succeeding in the contention in the current channel contention period and the number of the stations succeeding in the historic contention is larger than or equal to the preset threshold, if the sum is still minor than the threshold, the above processes may be repeated, to let the stations perform back-off and initiate a contention. In FIG. 4, the station STA3 succeeds in the contention in the second channel contention period of the channel contention, thus the sum of the number of the station succeeding in the contention in the current channel contention period and the number of the stations succeeding in historic contentions is 3, which is equal to the preset threshold, then the AP transmits a third request response frame in the broadcast mode after waiting for the second preset time t2, to acknowledge successes of contention to all the stations succeeding in contentions, and terminates procedure.

If the sum of the number of the stations succeeding in the contention in the current channel contention period and the number of the stations succeeding in the historic contention is minor than the preset threshold, the AP may continuously repeat the above steps 220 and 231', until the number of stations succeeding in contentions reaches the preset threshold. However, take factors such as delay into consideration, an upper limit of the number of contention periods may be set, and when the number of continuous periods in which contentions are initiated reaches the upper limit, even though the number of the stations succeeding in contentions does not reach the preset threshold, a contention in a new channel contention period would not be initiated.

In a preferred implementation of the present invention, the method further includes:

judging whether the number of channel contention periods reaches a preset period threshold, if yes, directly executing the step of transmitting, by the access point, the third request response frame in the broadcast mode after waiting for the second preset time, to acknowledge the successes of contention to all the stations succeeding in contentions; otherwise, executing the step of judging whether the sum of the number of stations succeeding in the contention in the current channel contention period and the number of stations succeeding in the historic contention is minor than the preset threshold.

In still another preferred implementation of the present invention, the method further includes: monitoring whether channel contention time reaches a preset time threshold, if yes, directly executing the step of transmitting, by the access point, the third request response frame in the broadcast mode after waiting for the second preset time, to acknowledge the successes of contention to all the stations succeeding in contentions. In the implementation, since all the stations complete the acknowledgement of a success of contention after receiving the third request response frame, hence, when the channel contention time is reached, the acknowledgement of a success of contention can be performed to all the stations succeeding in contentions through the third request response frame directly, there is no need to transmit any extra contention termination frame.

When the number of all the stations succeeding in contentions reaches the preset threshold, or the number of continuous contention periods reaches the preset period threshold, or the channel contention time reaches the preset time threshold, the AP will transmit a G-CTS frame at time t2 after the RTS frame in the last channel contention period is transmitted. The third request response frame G-CTS acknowledges a success of contention to all stations succeeding in contentions. Meanwhile, the third request response frame G-CTS also allocates frequency and/or time resources to all the stations succeeding in contentions.

Since whether to initiate a contention in a new channel contention period is decided by an AP, in the present method, it requires that the time length of t2 is minor than that of t1. In an implementation, t1 may be PIFS (point (coordination function) interframe space) or DIFS, whereas t2 may be SIFS (short interframe space).

When receiving the G-CTS frame, all the stations succeeding in contentions transmit data according to the allocated frequency and/or time resources.

After all the stations succeeding in contentions finish data transmitting, the AP transmits G-BA to perform acknowledgement response to all the stations succeeding in contentions.

Figure 5A:
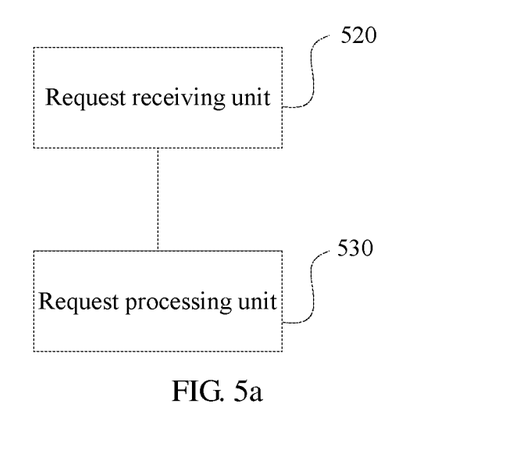
FIG. 5*a* is a schematic modular structure diagram of an access point implementing an OFDMA contention according to the present invention.

FIG. 5a is a schematic modular structure diagram of an access point of the present invention, as shown in FIG. 5a, the access point includes:

a request receiving unit 520, configured to receive a contention request frame transmitted by a station on a subchannel; and a request processing unit 530, configured to judge whether a sum of a number of stations succeeding in a contention in a current channel contention period and a number of stations succeeding in a historic contention is minor than a preset threshold, if yes, trigger the station to enter a next channel contention period.

Figure 5B:
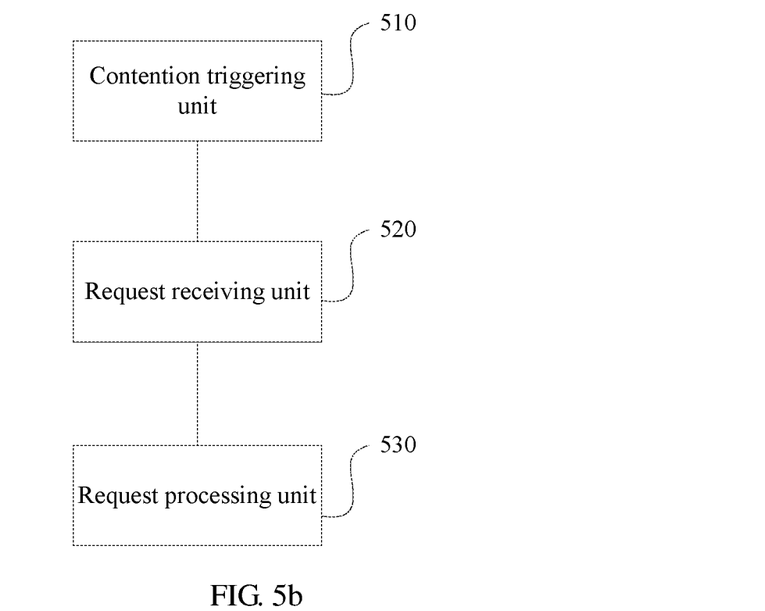
FIG. 5*b* is another schematic modular diagram of an access point implementing an OFDMA contention according to the present invention.

Referring to FIG. 5b, the access point further includes:

a contention triggering unit 510, configured to make the station be triggered to perform a channel contention.

Figure 6:
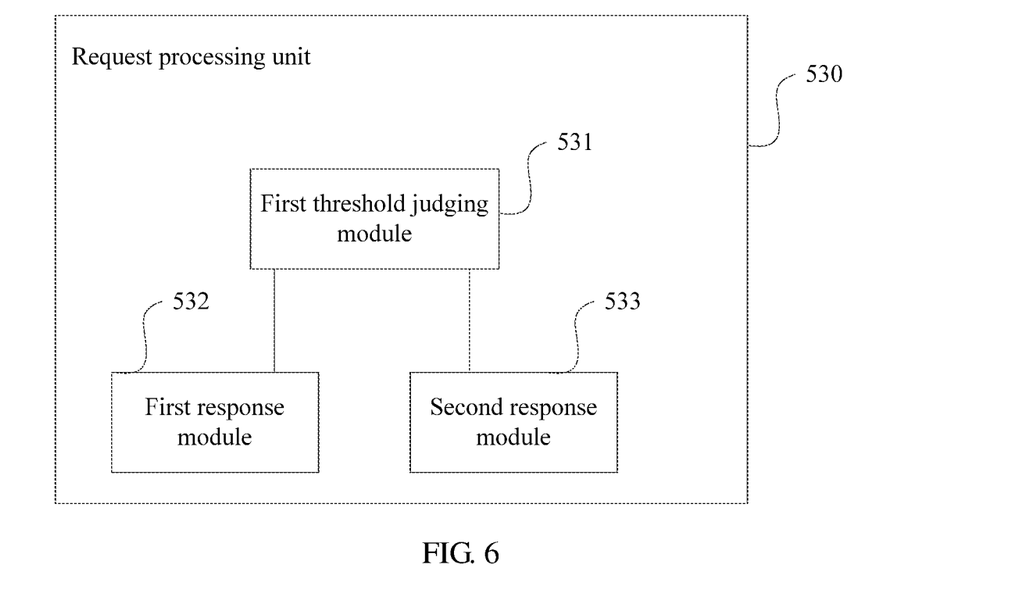
FIG. 6 is a schematic modular diagram of a request processing unit according to an embodiment of the present invention.

Referring to FIG. 6, in an implementation of the present invention, the request processing unit 530 includes:

a first threshold judging module 531, configured to judge whether the sum of the number of stations succeeding in the contention in the current channel contention period and the number of stations succeeding in the historic contention is minor than the preset threshold after the channel contention, if yes, transmit a first notification message to a first response module; or transmit a second notification message to a second response module;

the first response module 532, configured to transmit a first request response frame in a broadcast mode according to the first notification message, to acknowledge a success of contention to a station succeeding in the contention in the current channel contention period, and trigger the station to enter the next channel contention period; and the second response module 533, configured to transmit a second request response frame in the broadcast mode and according to the second notification message, to acknowledge a success of contention to a station succeeding in the contention in the last channel contention period.

Figure 7:
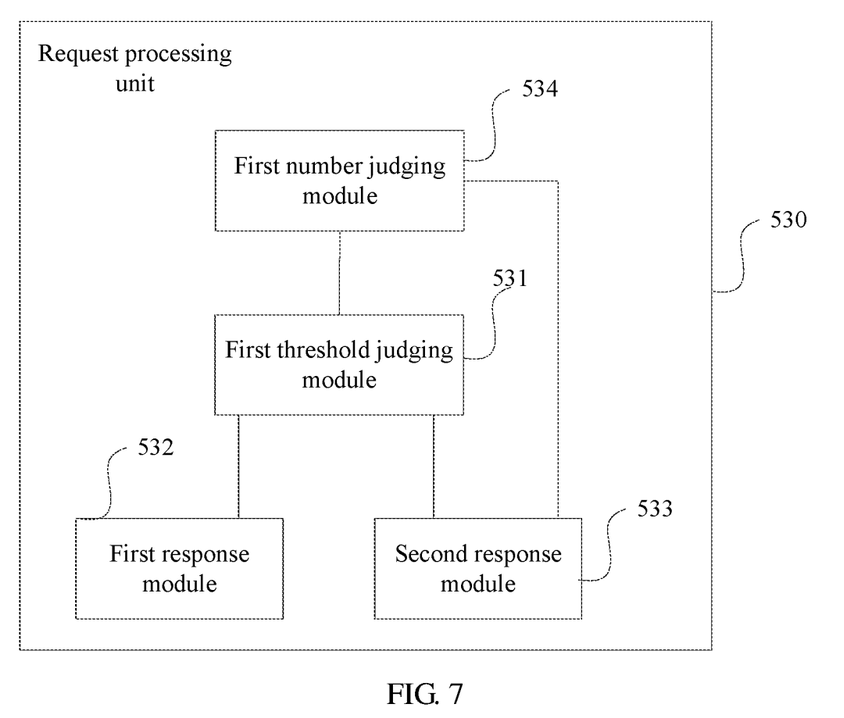
FIG. 7 is a schematic modular diagram of a request processing unit in a preferred solution according to an embodiment of the present invention.

Referring to FIG. 7, in a preferred solution of the implementation, the request processing unit 530 further includes:

a first number judging module 534, configured to judge whether the number of channel contention periods reaches a preset period threshold, if yes, transmit the second notification message to the second response module 533; otherwise, transmit a first threshold judging message to the first threshold judging module 531. The first threshold judging module 531 will judge whether the sum of the number of the stations succeeding in the contention in the current channel contention period and the number of the stations succeeding in the historic contention is minor than the preset threshold after the channel contention according to the first threshold judging message, if yes, transmit the first notification message to the first response module 532; otherwise, transmit the second notification message to the second response module 533.

In another preferred solution of the implementation, the request processing unit 530 further includes: a first time monitoring module, configured to monitor whether channel contention time reaches a preset time threshold, if yes, transmit a contention termination frame in the broadcast mode, to notify the station that the channel contention is terminated.

In this implementation, there are two ways to allocate resources to the station succeeding in a contention:

The first response module 532 is further configured to allocate a resource to the stations succeeding in the contention in the current channel contention period through the first request response frame; and the second response module 533 is further configured to allocate a resource to the stations succeeding in the contention in the last channel contention period through the second request response frame. Or, The second response module is further configured to allocate a resource to both the stations succeeding in the contention in the last channel contention period and the stations succeeding in the historic contention through the second request response frame.

Figure 8:
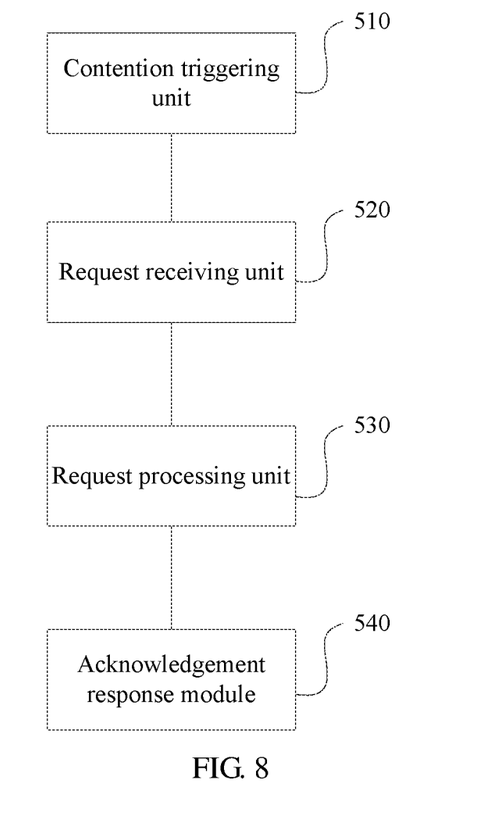
FIG. 8 is a schematic modular diagram of another access point implementing an OFDMA contention according to the present invention.

In addition, referring to FIG. 8, the access point may further include:

an acknowledgement response module 540, configured to perform an acknowledgment response after the stations succeeding in contentions finish data transmitting.

Figure 9:
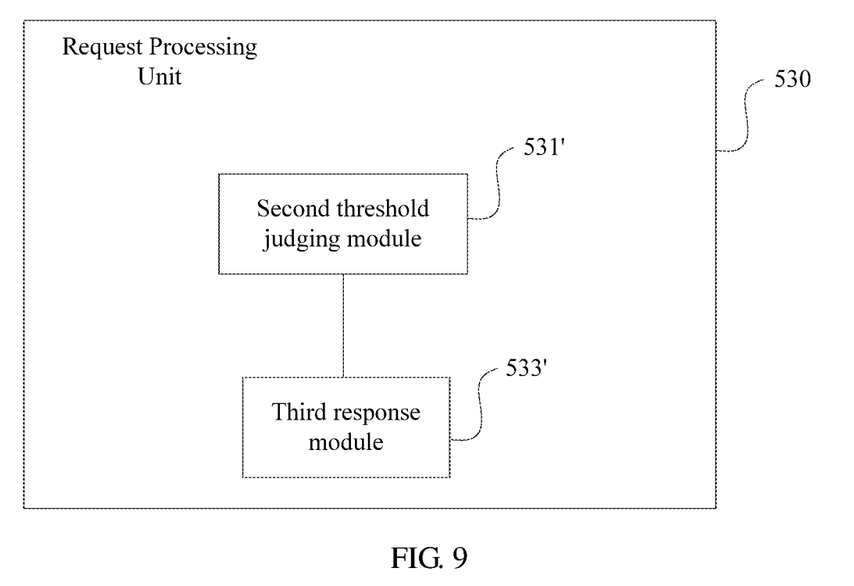
FIG. 9 is a schematic modular diagram of a request processing unit according to another embodiment of the present invention.

Referring to FIG. 9, another implementation of the present invention is similar to the above mentioned implementation, the differences lie in that, the request processing unit 530 includes:

a second threshold judging module 531', configured to judge whether the sum of the number of stations succeeding in the contention in the current channel contention period and the number of stations succeeding in the historic contention is minor than the preset threshold, if yes, the access point waits for a first preset time without response, to trigger the station to enter the next channel contention period; otherwise, transmit a third notification message to a third response module 533'; and the third response module 533', configured to transmit a third request response frame in the broadcast mode after waiting for a second preset time according to the third notification message, to acknowledge a success of contention to all the stations succeeding in contentions; where length of the first preset time is longer than that of the second preset time.

Figure 10:
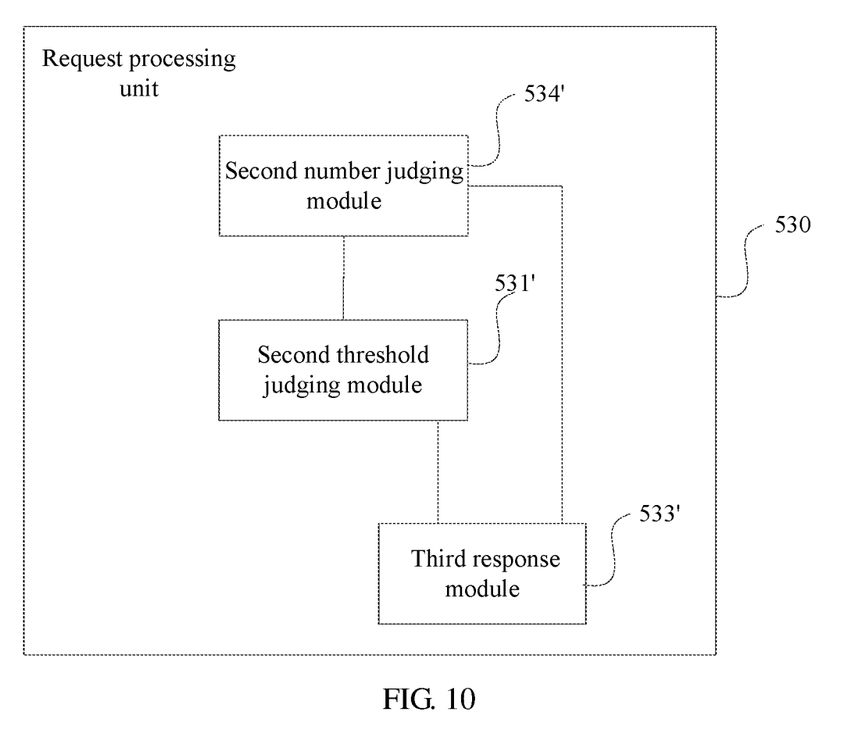
FIG. 10 is a schematic modular diagram of a request processing unit in a preferred solution according to another embodiment of the present invention.

Referring to FIG. 10, a preferred solution of the implementation is that, the request processing unit further includes:

a second number judging module 534', configured to judge whether the number of channel contention periods reaches a preset period threshold, if yes, transmit the third notification message to the third response module 533'; otherwise, transmit a second threshold judging message to the second threshold judging module 531'. The second threshold judging module 531' judges whether the sum of the number of stations succeeding in the contention in the current channel contention period and the number of stations succeeding in the historic contention is minor than the preset threshold according to the second threshold judging message, if yes, the access point waits for a first preset time without response, to trigger the station to enter the next channel contention period; otherwise, transmits the third notification message to the third response module 533'.

Another preferred solution of the implementation is that, the request processing unit 530 further includes: a second time monitoring module, configured to monitor whether channel contention time reaches a preset time threshold, if yes, transmit the third notification message to the third response module. As for allocating resources to the stations succeeding in contentions, in the implementation, the third response module 533' is further configured to allocate a resource to all the stations succeeding in contentions through the third request response frame.

Figure 11:
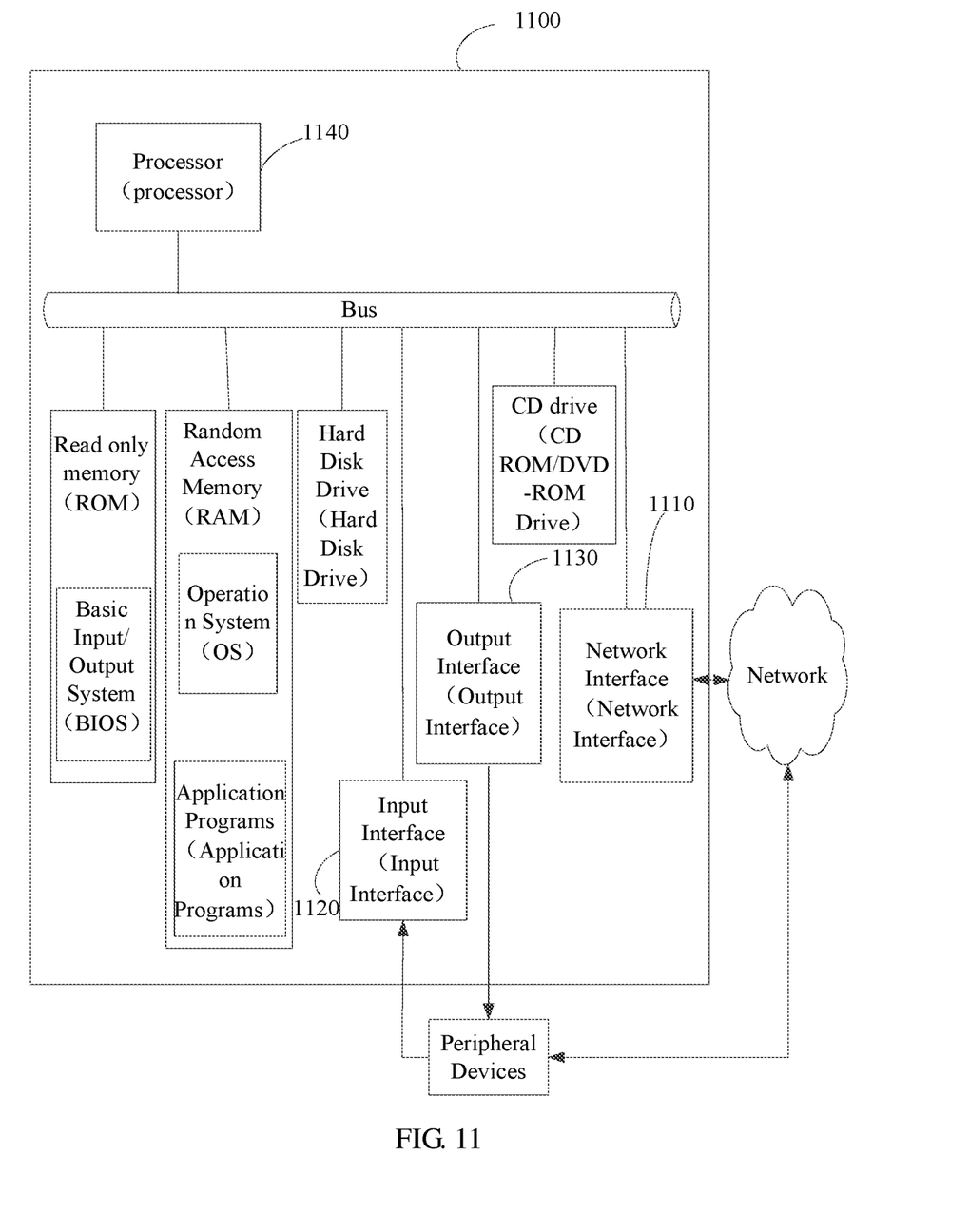
FIG. 11 is a schematic hardware structure diagram of an access point device according to the present invention.

FIG. 11 illustrates an embodiment of an access point device, as shown in FIG. 11, the structure of the access point device 1100 is similar to that of a computer in the prior art, and the access point device 1100 may communicate with peripheral devices, such as an station through a network interface 1110, to realize contention triggering, receiving a contention request from the station, and replying a request response frame and etc.; and may also realize the above functions through an input interface 1120 and an output interface 1130. Meanwhile, a processor 1140 may be used to process the contention requests from each station, and control the network interface 1110, or the input interface 1120 and the output interface 1130 to perform data exchange with each station. In addition, the network interface 1110, the input interface 1120, the output interface 1120 and the processor 1140 communicate with each other through a bus.

Figure 12:
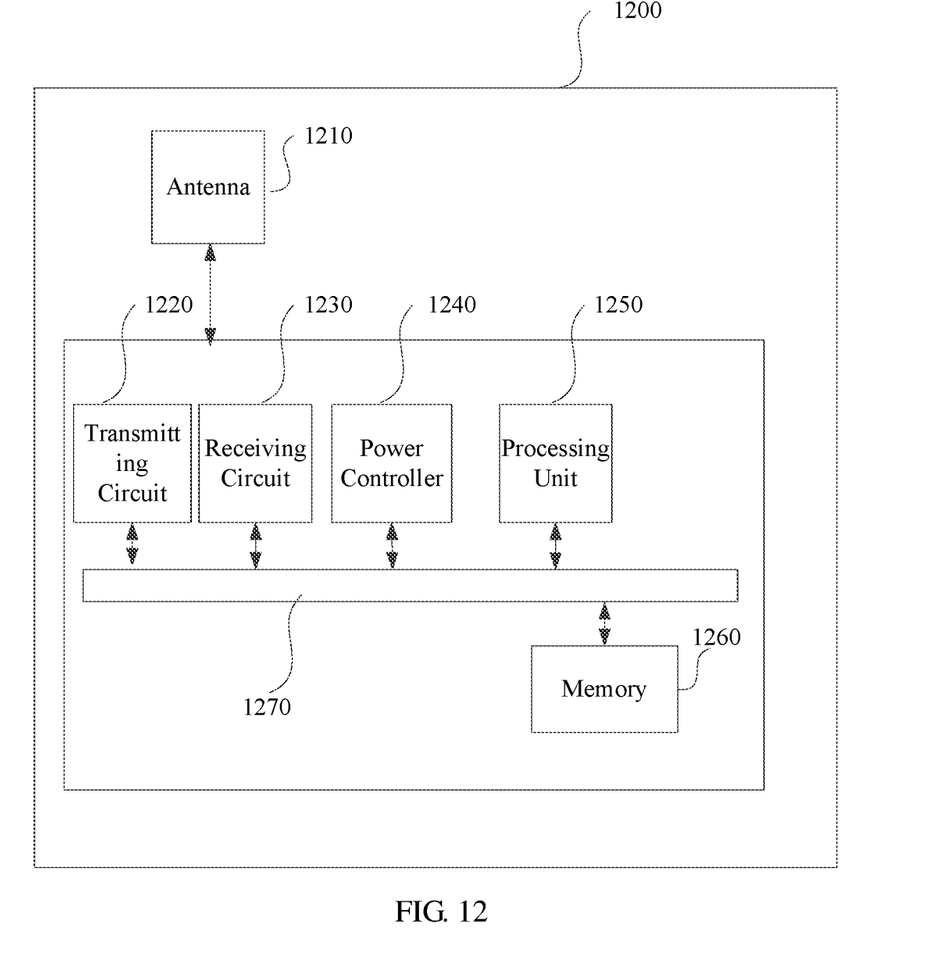
FIG. 12 is a schematic hardware structure diagram of a station device according to the present invention.

FIG. 12 illustrates an embodiment of a station device, in this embodiment, the station device 1200 includes an antenna 1210, a transmitting circuit 1220, a receiving circuit 1230, a power controller 1240, a processing unit 1250 and a memory 1260. The processing unit 1250 controls operations of the station device 1200, the processing unit 1250 may also be called as CPU. The memory 1260 may include a read-only memory and a random access memory, and provide instructions and data to the processing unit 1250. Part of the memory 1260 may further include a nonvolatile random access memory (NVRAM). In a particular application, the station device may be embedded into or itself may be a wireless communication device such as a mobile telephone and the like, and may further include a carrier for containing the transmitting circuit 1220 and the receiving circuit 1230, so as to allow the station device 1200 to perform data transmitting and receiving in a remote position. The transmitting circuit 1220 and the receiving circuit 1230 may be coupled to the antenna 1210. Each component of the station device 1200 may be coupled together through a bus system 1270, where, besides the data bus, the bus system 1270 may further include a power bus, a control bus, and a status signal bus. However, for clarity, each kind of buses is labeled as the bus system 1270. The station device 1200 may further include a power controller 1240.

The processing unit 1250 may implement or execute each step and logic diagram disclosed in the method embodiments of the present invention. The processing unit 1250 may be a micro processor or may also be any ordinary processor, decoder and etc. A software module may be located at a ordinary storage medium in the art such as a random access memory, a flash memory, a read only memory, a programmable read only memory or an electrical erasable programmable memory, or a register and the like. The storage medium is located at the memory 1260, where the processing unit 1250 reads information in the memory 1260, and implement steps in the above methods with combination of its hardware.

The OFDMA contention method and the access point according to embodiments of the present invention, may go on with initiating a contention when the number of stations succeeding in a initial contention is minor than a certain threshold, so as to increase the number of stations succeeding in contentions, and thus improve the throughput of the OFDMA system; meanwhile, the OFDMA contention method is compatible with the existing mechanism, when the stations succeeding in the initial contention reaches the threshold, there is no extra cost, which is easily combined with the current OFDMA system, and is convenient to be widely applied.

Persons of ordinary skill in the art should understand that various aspects or possible implementation of various aspects of the present invention may be embodied as a system, method or computer program products. Accordingly, aspects, or possible implementation of various aspects of the present invention may use a form of an embodiment of entirely hardware, an embodiment of entirely software (including firmware, resident software, etc.), or an embodiment of a combination of software and hardware, which are referred to as "circuit", "module" or "system" herein. Moreover, various aspects or possible implementations of various aspects of the present invention may use the form of a computer program product, where the computer program product refers to computer readable program codes stored in a computer readable medium.

The computer readable storage medium may be a computer readable signal medium or a computer readable storage medium. Where the computer readable storage medium includes but is not limited to, electronic, magnetic, optical, electromagnetic, infrared, or semiconductor systems, devices, or apparatuses, or any suitable combination of the foregoing, such as a random access memory (RAM), a read only memory (ROM), an erasable programmable read only memory (EPROM or flash memory), an optical fiber, or a portable read-only memory (CD-ROM).

The processor in a computer reads the computer readable program code stored in the computer readable medium, such that the processor can execute a functional action as specified in each step or a combination of different steps in the flow chart; generate an apparatus that implements the functional action as specified in each block or a combination of different blocks in the diagram.

The computer readable program code may be entirely executed on a user's computer, partly executed on the user's computer, as a separate package, partly executed on the user's computer and partly executed on a remote computer, or entirely executed on a remote computer or a processor. It should also be noted that, in some alternative embodiments, each step in the flowchart, or function indicated in each block in the diagram, may not occur in accordance with the sequence indicated in the figures. For example, depending on the functionality involved, two steps or two blocks shown in succession, may actually be executed concurrently, or the blocks may sometimes be executed in the reverse order.

Apparently, persons skilled in the art may make various modifications or variations to the present invention without departing from the scope of the invention. Thus, if such modifications and variations of the present invention belong to scope of the claims of the present invention and their equivalents technology, the present invention is also intended to include such modifications and variations.

What is claimed is:

1. A contention method performed by an access point for a plurality of stations, comprising:
   receiving, by the access point, a first uplink frame transmitted by a station of the plurality of stations;
   transmitting, by the access point, a first frame responding to the first uplink frame, the first frame responding to the first uplink frame is used to acknowledge the first uplink frame and trigger the plurality of stations to enter channel contention, wherein triggering the plurality of stations to enter channel contention comprises allocating a frequency resource used for channel contention to the plurality of stations;
   determining, by the access point, whether a sum of a number of stations succeeding in a channel contention period and a sum of a number of stations succeeding in a historic channel contention is less than a preset threshold; and
   in response to the sum of the number of stations succeeding in the channel contention period being less than the preset threshold, the method further comprises repeatedly triggering, by the access point, the plurality of stations to enter a next channel contention period until it is determined that the number of stations succeeding in the channel contention is greater than or equal to the preset threshold.

2. The method according to claim 1, wherein after transmitting the first frame responding to the first uplink frame, the method comprises:
   receiving, by the access point, a second uplink frame transmitted by the plurality of stations, the second uplink frame is used to indicate that the plurality of stations have data to be transmitted.

3. The method according to claim 1, wherein the first uplink frame is used to indicate that the station which transmits the first uplink frame has data to be transmitted.

4. The method according to claim 1, wherein triggering the plurality of stations to enter channel contention further comprises allocating a time resource used for channel contention to the plurality of stations.

5. The method according to claim 2, wherein after receiving the second uplink frame transmitted by the plurality of stations, the method comprises:
   transmitting, by the access point, a second frame responding to the second uplink frame, which is used to acknowledge the second uplink frame and trigger the plurality of stations to transmit uplink data, wherein triggering the plurality of stations to transmit the uplink data comprises allocating a frequency resource used for transmitting uplink data to the plurality of stations.

6. A contention method, comprising:
   transmitting, by a station of a plurality of stations, a first uplink frame; and
   receiving, by the station, a first frame responding to the first uplink frame, the first frame is used to acknowledge the first uplink frame and trigger the plurality of stations to enter channel contention, wherein triggering the plurality of stations to enter a channel contention comprises allocating a frequency resource used for channel contention to the plurality of stations, wherein an access point determines whether a sum of a number of stations succeeding in a channel contention period and a sum of a number of stations succeeding in a historic channel contention is less than a preset threshold, and in response to the sum of the number of stations succeeding in the channel contention period being less than the preset threshold, the method further comprises repeatedly triggering, by the access point, the plurality of stations to enter a next channel contention period until it is determined that the number of stations succeeding in the channel contention is greater than or equal to the preset threshold.

7. The method according to claim 6, wherein after receiving the first frame responding to the first uplink frame, the method comprises:

transmitting, by the station, a second uplink frame which is used to indicate that the station that transmits the second uplink frame has data to be transmitted.

8. The method according to claim 6, wherein the first uplink frame is used to indicate that the station that transmits the first uplink frame has data to be transmitted.

9. The method according to claim 6, wherein triggering the plurality of stations to enter channel contention further comprises allocating a time resource used for channel contention to the plurality of stations.

10. The method according to claim 7, wherein after transmitting the second uplink frame, the method comprises:

receiving, by the station, a second frame responding to the second uplink frame, the second frame is used to acknowledge the second uplink frame and trigger the plurality of stations to transmit uplink data, wherein triggering the plurality of stations to transmit uplink data comprises allocating a frequency resource used for transmitting uplink data to the plurality of stations.

11. An apparatus at an access point side, comprising:

a receiver, configured to receive a first uplink frame transmitted by a station of a plurality of stations;

a transmitter, configured to transmit a first frame responding to the first uplink frame, the first frame is used to acknowledge the first uplink frame and trigger the plurality of stations to enter channel contention, wherein triggering the plurality of stations to enter channel contention comprises allocating a frequency resource used for channel contention to the plurality of stations; and a processor, configured to determine whether a sum of a number of stations succeeding in a channel contention period and a sum of a number of stations succeeding in a historic channel contention is less than a preset threshold, wherein in response to the sum of the number of stations succeeding in the channel contention period being less than the preset threshold, the transmitter is further configured to repeatedly trigger the plurality of stations to enter a next channel contention period until it is determined that the number of stations succeeding in the channel contention is greater than or equal to the preset threshold.

12. The apparatus according to claim 11, wherein the receiver is further configured to receive a second uplink frame transmitted by the plurality of stations, the second uplink frame is used to indicate that the plurality of stations have data to be transmitted.

13. The apparatus according to claim 11, wherein the first uplink frame is used to indicate that the station that transmits the first uplink frame has data to be transmitted.

14. The apparatus according to claim 11, wherein triggering the plurality of stations to enter channel contention further comprises allocating a time resource used for channel contention to the plurality of stations.

15. The apparatus according to claim 12, wherein the transmitter is further configured to transmit a second frame responding to the second uplink frame, the second frame is used to acknowledge the second uplink frame and trigger the plurality of stations to transmit uplink data, wherein triggering the plurality of stations to transmit the uplink data comprises allocating a frequency resource used for transmitting the uplink data to the plurality of stations.

16. An apparatus at a station side, comprising:

a transmitter, configured to transmit a first uplink frame; and a receiver, configured to receive a first frame responding to the first uplink frame, the first frame is used to acknowledge the first uplink frame and trigger a plurality of stations to enter channel contention, wherein triggering the plurality of stations to enter channel contention comprises allocating a frequency resource used for channel contention to the plurality of stations, wherein an access point determines whether a sum of a number of stations succeeding in a channel contention period and a sum of a number of stations succeeding in a historic channel contention is less than a preset threshold, and wherein in response to the sum of the number of stations succeeding in the channel contention period being less than the preset threshold the access point repeatedly triggers the plurality of stations to enter a next channel contention period until it is determined that the number of stations succeeding in the channel contention is greater than or equal to the preset threshold.

17. The apparatus according to claim 16, wherein the transmitter is further configured to transmit a second uplink frame that is used to indicate that a station that transmits the second uplink frame has data to be transmitted.

18. The apparatus according to claim 16, wherein the first uplink frame is used to indicate that a station that transmits the first uplink frame has data to be transmitted.

19. The apparatus according to claim 16, wherein triggering the plurality of stations to enter a channel contention further comprises allocating a time resource used for channel contention to the one or more stations.

20. The apparatus according to claim 17, wherein the receiver is further configured to receive a second frame responding to the second uplink frame, the second frame is used to acknowledge the second uplink frame and trigger the plurality of stations to transmit uplink data, wherein triggering the plurality of stations to transmit uplink data comprises allocating a frequency resource used for transmitting uplink data to the plurality of stations.

* * * * *